United States Patent
Wilde et al.

(10) Patent No.: US 8,174,615 B2
(45) Date of Patent: May 8, 2012

(54) METHOD FOR CONVERTING AN IMAGE AND IMAGE CONVERSION UNIT

(75) Inventors: Matthias Wilde, Stuttgart (DE); Christian Unruh, Stuttgart (DE)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 12/411,052

(22) Filed: Mar. 25, 2009

(65) Prior Publication Data
US 2009/0273709 A1 Nov. 5, 2009

(30) Foreign Application Priority Data
Apr. 30, 2008 (EP) .................................. 08008271

(51) Int. Cl.
H04N 7/01 (2006.01)
G09G 5/10 (2006.01)
G06K 9/32 (2006.01)

(52) U.S. Cl. ......... 348/448; 348/452; 345/660; 382/298
(58) Field of Classification Search .................. 348/448, 348/452; 345/660; 382/298
See application file for complete search history.

(56) References Cited

U.S. PATENT DOCUMENTS

| | | | | |
|---|---|---|---|---|
| 5,929,918 A * | 7/1999 | Pereira et al. | 348/448 |
| 6,421,090 B1 * | 7/2002 | Jiang et al. | 348/452 |
| 6,567,468 B1 * | 5/2003 | Kato et al. | 375/240.12 |
| 6,687,300 B1 * | 2/2004 | Fujita et al. | 375/240.16 |
| 7,142,729 B2 * | 11/2006 | Wredenhagen et al. | 382/300 |
| 7,321,400 B1 * | 1/2008 | Chou et al. | 348/616 |
| 7,349,029 B1 * | 3/2008 | Chou | 348/448 |
| 7,362,378 B2 | 4/2008 | Orlick | |
| 7,375,762 B2 * | 5/2008 | Mishima et al. | 348/441 |
| 7,414,671 B1 * | 8/2008 | Gallagher et al. | 348/625 |
| 7,548,275 B1 * | 6/2009 | Honda | 348/448 |
| 7,701,508 B2 * | 4/2010 | Wang et al. | 348/452 |
| 7,782,401 B1 * | 8/2010 | Chou | 348/581 |
| 7,843,509 B2 * | 11/2010 | Hahn et al. | 348/448 |
| 7,893,994 B2 * | 2/2011 | Gambhire | 348/458 |
| 2002/0027610 A1 * | 3/2002 | Jiang et al. | 348/448 |
| 2003/0038817 A1 | 2/2003 | Kawamura et al. | |
| 2004/0126037 A1 * | 7/2004 | Kim et al. | 382/300 |
| 2004/0207753 A1 * | 10/2004 | Jung | 348/452 |
| 2004/0233326 A1 * | 11/2004 | Yoo et al. | 348/452 |
| 2004/0257467 A1 * | 12/2004 | Nicolas | 348/452 |
| 2005/0073607 A1 | 4/2005 | Ji et al. | |
| 2006/0158550 A1 * | 7/2006 | Zhou et al. | 348/452 |

(Continued)

FOREIGN PATENT DOCUMENTS
CN 1582572 A 2/2005
(Continued)

*Primary Examiner* — Brian Yenke
(74) *Attorney, Agent, or Firm* — Oblon, Spivak, McClelland, Maier & Neustadt, L.L.P.

(57) ABSTRACT

A method for converting an image and an image conversion unit are provided, the method comprising: determining a target pixel of pixels of the image; calculating a first value based on pixel values of a first set of pixels, wherein the first set of pixels do not include pixels in a column of the target pixel; determining a second value based on pixel values of a second set of pixels, wherein the second set of pixels are located in the column of the target pixel; and determining a pixel value of the target pixel based on adding the first and second values. The method and the image conversion unit are used e.g. for converting an image in interlaced format to progressive scan format.

12 Claims, 3 Drawing Sheets

U.S. PATENT DOCUMENTS

| | | | |
|---|---|---|---|
| 2006/0176393 A1* | 8/2006 | Fazzini | 348/448 |
| 2006/0176394 A1* | 8/2006 | Fazzini | 348/448 |
| 2006/0238650 A1* | 10/2006 | Wredenhagen et al. | 348/452 |
| 2006/0274196 A1* | 12/2006 | MacInnis | 348/448 |
| 2007/0103588 A1* | 5/2007 | MacInnis et al. | 348/448 |
| 2007/0296857 A1* | 12/2007 | Lee | 348/452 |
| 2008/0062309 A1* | 3/2008 | Zhai et al. | 348/452 |
| 2008/0111915 A1* | 5/2008 | Wang et al. | 348/448 |
| 2008/0174694 A1* | 7/2008 | Morad et al. | 348/448 |
| 2009/0102966 A1* | 4/2009 | Jiang et al. | 348/448 |
| 2009/0268088 A1* | 10/2009 | Zhou | 348/452 |

FOREIGN PATENT DOCUMENTS

| | | |
|---|---|---|
| EP | 1 631 068 A2 | 3/2006 |
| WO | WO 99/14944 | 3/1999 |
| WO | WO 01/17244 A1 | 3/2001 |
| WO | WO 03/039147 A1 | 5/2003 |

* cited by examiner

METHOD FOR CONVERTING AN IMAGE AND IMAGE CONVERSION UNIT

An embodiment of the invention relates to a method for converting an image in interlaced format to progressive scan format. A further embodiment of the invention relates to an image conversion unit. A further embodiment relates to a computer program product and a computer readable storage medium.

BACKGROUND

An image on a television screen consists of pixels, arranged horizontally in rows, generally offset vertically by one pixel position from one another. Each pixel is assigned three values which indicate the respective intensities of the red, green, and blue components of the pixel. A video image is generated by sequentially displaying the rows of pixels as horizontal lines of the image.

Existing analog broadcast standards such as NTSC, PAL and SECAM use two video fields to generate a single video frame. Each field includes one-half of the horizontal lines that make-up the image frame. One field includes all of the odd numbered lines of the frame and the other field includes all of the even numbered lines. One way to eliminate artifacts like image flickering is to convert the interface-scan field into progressive-scan frames. In a progressive-scan frame, both the odd and even image lines are displayed.

One way to generate progressive-scan frames from interlace-scan fields is to interpolate interstitial lines in each field. Thus, the lines of the odd field are used to interpolate even-numbered lines and the lines of the even field are used to interpolate odd-numbered lines.

U.S. Pat. No. 7,362,378 B2 discloses a method for converting an interlaced scan image, having a plurality of pixels arranged in a matrix of rows and columns, to a progressive scan image processes interpolate picture elements at target pixel positions between two successive rows of the interlaced scan image. The method determines if a pixel on a current row is an edge pixel and if the pixel is an edge pixel, it determines an approximate angle for the edge based on a difference between the column subset of at least the edge pixels on the current row and the column subset of at least one edge pixel on a previous row. The method uses the angle to determine which pixel on the current row and previous row correspond to the target pixel and interpolates the value of the target pixel from the corresponding pixels.

Thus, today's "interlace-to-progressive" signal processing methods use techniques to first identify an edge and/or slanted line and second interpolate the missing information along those edges and/or slanted lines. These two basic steps require usually a lot of logic to clearly detect and/or identify an edge and/or slanted line. This additional logic is mostly not suitable to be implemented in either software and/or hardware due to the non-linearity of the decisions to be made.

The disadvantage of current state of the art interlace-to-progressive algorithms is that they achieve poor quality on lines and edges which are slanted towards the horizontal axis. This is typically known as "stair case-effect". This artifact disturbs the visual impression of the picture significantly.

SUMMARY

It is an object of the invention to provide a method for converting an image and an image conversion unit with low computational complexity, e.g. for converting an image in interlaced format to progressive scan format.

This object is solved by a method according to claim 1, a pixel value generating unit according to claim 10, a computer program product according to claim 14 and a computer readable storage medium according to claim 15.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in and constitute a part of the specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts. Further it is to be understood that throughout the present specification directional terminology such as "top", "bottom", "left", "right" is not used restrictively but simply chosen for purposes of easier description. In this regard, directional terminology such as "top", "bottom", etc. is used with reference to the orientation of components being described in the figures. Because components of the embodiments of the present invention can be positioned in a number of different orientations, the directional terminology is used for purposes of illustration and is in no way limiting.

DETAILED DESCRIPTION

In the following, embodiments of the invention are described. It is important to note, that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structured or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
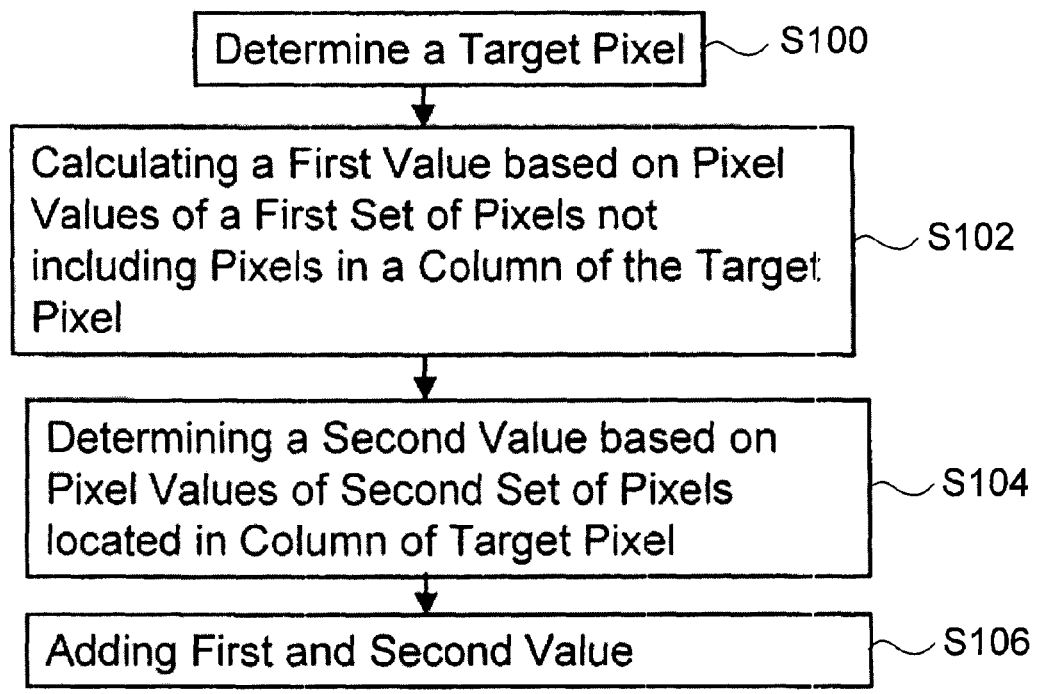
FIG. 1 shows steps of an embodiment of the invention.

In FIG. 1 it is shown that in a step S100 a target pixel of an image is determined. The image might comprise a plurality of pixels arranged in a matrix of rows and columns.

In a step S102 a first value is calculated based on pixel values of a first set of pixels not including pixels in a column of the target pixel. The first set of pixels might also be referred to as region around the target pixel, which is used in order to determine a pixel value for the target pixel. The region has a predetermined size around the target pixel and includes a first subset of pixels and a second subset of pixels in rows above said target pixel and a third subset of pixel and a fourth subset of pixels in rows below the target pixel, wherein the first and third subset of pixels are situated in columns left to the target pixel and the second and the fourth subset of pixels are situated in columns right to the target pixel.

The pixel value might be a luminance or gray value or a chrominance value of e.g. a YCbCr-color space, an RGB-color space, a HSV-color space, a YUV-color space or any other color space.

In a step S104 a second value based on pixel values of a second set of pixels located in a column of the target pixel is determined. The second value might be determined by building an average of a pixel value of a pixel in a row above the target pixel and of a pixel value of a pixel below the target pixel.

In step S106 the first and the second value are added in order to generate the pixel value of the target pixel.

Figure 2:
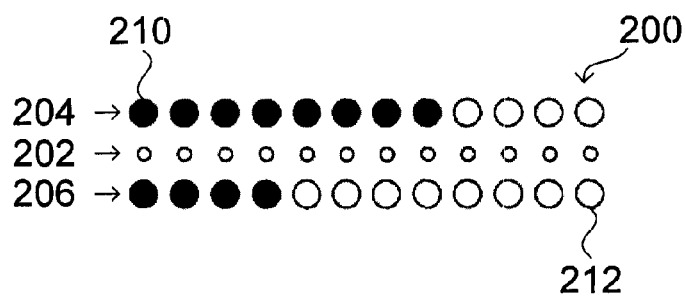
FIG. 2 shows a part of an image frame in order to further elucidate an embodiment of the invention.

In FIG. 2 a part of an image 200 is depicted. The image 200 comprises three rows 202, 204, 206 of pixels, whereas the pixel values for an interstitial row 202 has to be determined in order to obtain pixel values for all pixels of the image 200. An image without pixel values for the interstitial row 202 might be an interlaced image, where only pixels of the even or odd rows include pixel values.

A first row 204 above the interstitial row 202 and a second row 206 below the interstitial row 202 comprise pixels with black values (e.g. pixel 210) and with white values (e.g. pixel 212). According to an 8-bit scheme in order to code different gray values or luminance values of the pixels the black pixel 210 might have a pixel value equal to zero and the white pixel 212 might have a grey value equal to 255. A person having ordinary skill in the art might easily understand that corresponding other pixel quantization schemes might be used and that instead of luminance or gray values also chrominance values, e.g. of an YCbCr-color space might be used as pixel values.

As is readily apparent for a person having ordinary skill in the art, the proposed method might also be used if the image is turned by 90°, i.e. if vertical "rows" are missing. In this respect the wording "rows" and "columns" used throughout the claims and the description might be interpreted to comprise "vertically oriented rows" and "horizontally oriented columns".

Figure 3:
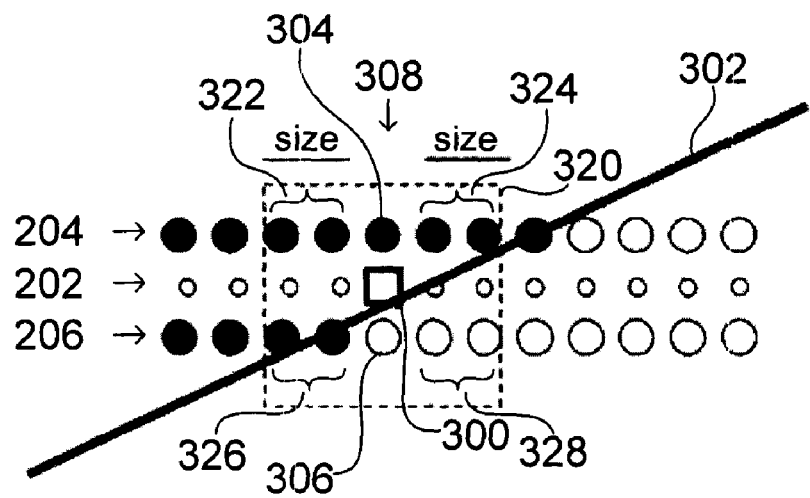
FIG. 3 shows a part of an image frame for illustrating a further embodiment of the invention.

As it is depicted in FIG. 3 in order to determine the pixel value of a target pixel 300 it has to be taken into account that an edge 302 might be represented in the video image. Thus, the pixel value of the target pixel 300 should not be simply an average of the pixels 304 and 306 situated in the same column 308 as the target pixel 300 in the row 204 above the target pixel 300 and in the row below 206 of the target pixel 300.

Thus, according to an embodiment of the invention a region 320 around the target pixel 300 is defined with a first subset of pixels 322, a second subset of pixels 324, a third subset of pixels 326 and a fourth subset of pixels 328. The first and second subset of pixels 322, 324 belongs to a row above the target pixel 300 and the third and fourth subset of pixels 326, 328 belongs to a row 206 below the target pixel 300. The first subset of pixels 322 and the third subset of pixels 326 belongs to columns left from the target pixel 300 and the second subset of pixels 324 and the fourth subset of pixels 328 belongs to columns on the right side of the target pixel 300.

According to an embodiment of the invention the pixel values of the first subset of pixels, the second subset of pixels, the third subset of pixels and the fourth subset of pixels 322, 324, 326, 328, are taken into account when calculating the first value which is added to the second value built from the pixels 304 and 306 below and above the target pixel 300. The proposed method does not need any particular information about an angle of the edge 302.

Figure 4:
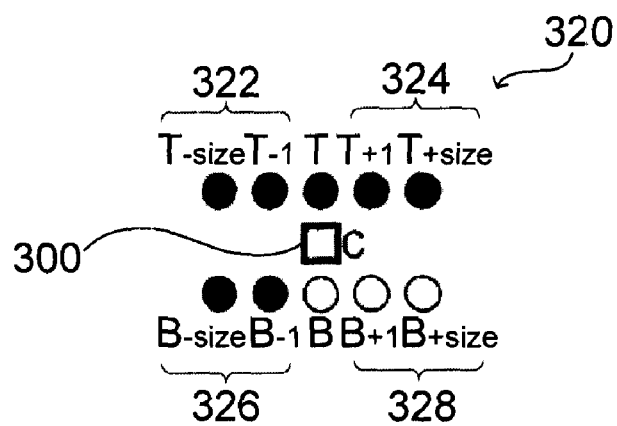
FIG. 4 shows a part of an image frame in accordance with a further embodiment of the invention.

In order to explain the algorithm more in detail in FIG. 4 the region 320 is depicted more in detail, wherein the pixels in a row above the target pixel 300 are named with T ("top") and the column position of the pixels of the row 204 above the target pixel 300 is depicted by indices "−size", "−1", "+1", "+size". Correspondingly, the pixels in a row below the target pixel 300 are depicted as "B" ("bottom") with indices "−size", "−1", "1", "size". The pixels in the same column 308 as the target pixel 300 are referenced by "T" ("top": The pixel above the target pixel 300) and "B" ("Bottom": The pixel below the target pixel 300). It is to be understood that the size of the region 320 might be adjusted by using a corresponding number of pixels in the respective subsets of first pixels 322, second pixels 324, third pixels 326 and fourth pixels 328. Good results are already achieved with a size equal to two, but of course larger or smaller sizes might be used as well.

Figure 5:
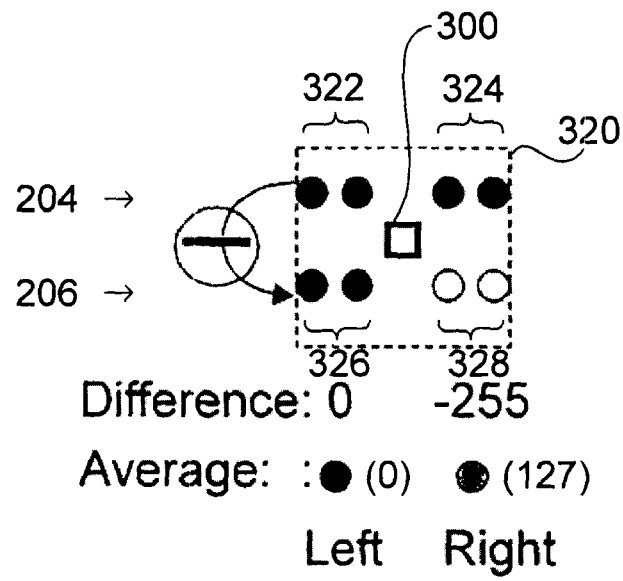
FIG. 5 shows a part of an image frame used to explain schematically a further embodiment of the invention.

In FIG. 5 it is depicted that averages and differences are calculated for corresponding pairs of pixels, wherein the pixels belong to the same columns. Since, e.g. in the example of FIG. 4 or FIG. 5, all pixel values of the first subset of pixels 322 and the third subset of pixels 326 are black pixels, the differences of the pixel values are zero and the average is a black pixel with a luminance value equal to zero.

On the right side of the target pixel 300 in the top row 204 the second subset of pixels 324 are black whereas the fourth subset of pixels 328 in the bottom row 206 are white. Thus, the difference of the top minus the bottom pixels is equal to −255, whereas the average is a gray value corresponding to a luminance value as the pixel value of 127.

Figure 6:
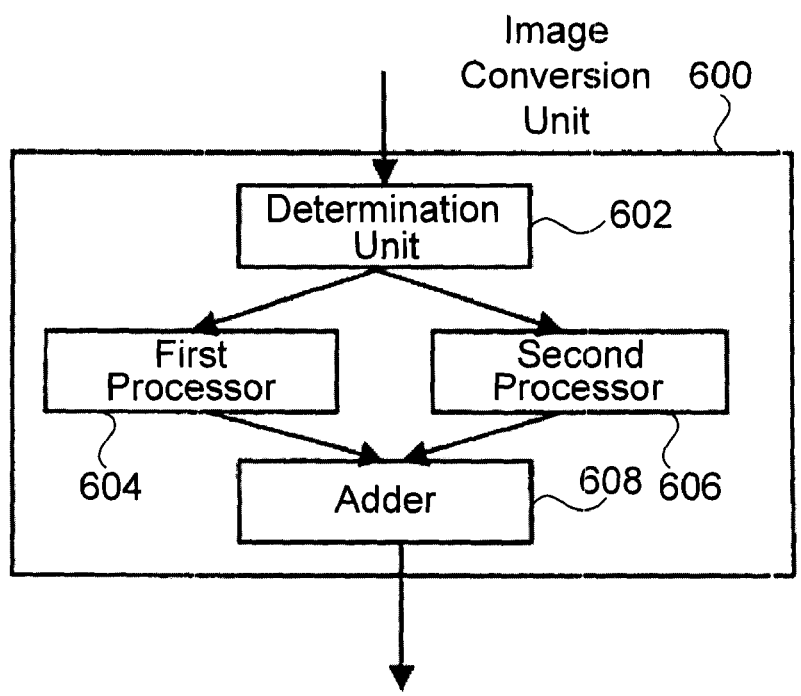
FIG. 6 shows a schematic arrangement of a further embodiment of the invention.

For each side (left side or right side of the target pixel 300) the differences between a top and a bottom pixel are summed up. The differences are summed up for both sides and compared with each other. The smaller value defines an orientation of the target pixel. In the example of FIG. 6 the summed-up differences of the left side are smaller. This results in a lower value for the left region. A first auxiliary value called the orientation might be calculated as $$difLeft = abs\left(\frac{1}{size} \cdot \sum_{n=-1}^{-size} (Tn - Bn)\right) \quad (1)$$

$$difRight = abs\left(\frac{1}{size} \cdot \sum_{n=1}^{size} (Tn - Bn)\right) \quad (2)$$

$$orientation = \frac{(sign(difLeft - difRight) + 1) \cdot sign(difLeft - difRight)}{2}, \quad (3)$$

with: difLeft: sum of differences for left side; difRight: sum of differences for right side; abs( ): absolute value of ( ); size: size of the region 320 to one side; n: index for summing the columns on the respective side; Tn: Pixel value of Pixel of top row with index n, Bn: Pixel value of bottom row with index n; sign( ): function delivering the sign of the argument in ( ); orientation: first auxiliary value.

In order to further derive the pixel value of the target pixel, the average for the left side is calculated $$avgLeft = \frac{1}{2 \cdot size} \cdot \sum_{n=-1}^{-size} (Tn + Bn) \quad (4)$$

with: avgLeft: average for left side; size: size of region 320 to one side; n: index for summing the columns on the respective side; Tn: pixel value of pixel of top row with index n, Bn: pixel value of bottom row with index n;

and the average on the right side is calculated as well $$avgRight = \frac{1}{2 \cdot size} \cdot \sum_{n=1}^{size} (Tn + Bn) \qquad (5)$$

with: avgRight: average for right side; size: size of region 320 to one side; n: index for summing the columns on the respective side; Tn: pixel value of pixel of top row with index n, Bn: pixel value of pixel of bottom row with index n.

The corresponding average value (avgRight or avgLeft) of the pixels in columns at the side of the target pixel with the lower absolute value of the sum of differences is used to determine whether a negative first value or a positive first value is added to the second value (e.g. the average of the pixels below and above the target pixel). If the corresponding average value is below the second value a negative first value is used and if the corresponding average value is above the second value a positive first value is used. This might be determined by a second auxiliary value "direction", which is determined as $$direction = \qquad (6)$$
$$sign\left((1 - orientation) \cdot avgLeft + orientation \cdot avgRight - \frac{T+B}{2}\right)$$

with: direction: second auxiliary value; sign( ): function delivering the sign of the argument in ( ); orientation: first auxiliary value derived from eq. (3); avgLeft: average on the left side derived from eq. (4), avgRight: average on the right side derived from eq. (5), T: pixel value of pixel in same column as target pixel in a row above target pixel; B: pixel value of pixel in same column as target pixel in a row below target pixel.

Together with the "direction" the pixel value for the target pixel might be determined as $$pixel = \frac{T+B}{2} + direction \cdot \qquad (7)$$
$$\left(abs\left(\frac{T-B}{2}\right) - \left(\frac{(1 - orientation) \cdot difLeft + orientation \cdot difRight}{2}\right)\right)$$

with pixel: pixel value of target pixel; T: pixel value of pixel in same column as target pixel in a row above target pixel; B: pixel value of pixel in same column as target pixel in a row below target pixel. direction: second auxiliary value derived from eq. (6); abs( ): function delivering the absolute value of the term in ( );orientation: first auxiliary value derived from eq. (3); difLeft: sum of differences for left side derived from eq. (1); difRight: sum of differences for right side derived from eq. (2).

The last term in the parenthesis describes a difference value. If there is a large difference, the pixel value of the target pixel is close to the presented edge or inbetween top and bottom. A small difference reflects a strong correlation to either the top pixel T or bottom pixel B.

A corresponding image conversion unit 600 is depicted in FIG. 6. The image conversion unit 600 comprises a determination unit 602 configured to determine a target pixel of pixels of the image, a first processor 604 configured to calculate a first value based on pixel values of a first set of pixels, wherein the first set of pixels do not include pixels in a column of the target pixel; a second processor 606 configured to determine a second value based on pixel values of a second set of pixels, wherein the second set of pixels are located in the column of the target pixel; and an adder 608 configured to add the first and second values.

Further on, the first processor might be configured to determine differences of pixel values of respective pairs of pixels situated in a common column of the first to fourth subset of pixels; to determine a first sum of the differences of the columns left from the target pixel and a second sum of differences of the columns right from the target pixel; to determine a further average value of the pixels in columns at the side of the target pixel with the lower absolute value of the first sum and the second sum; and to generate a negative first value if the further average value is below the second value and/or to generate a positive first value if the further average value is above the second value.

The proposed method might be implemented with low computational complexity in modern central processing units CPUs and/or graphical processing units (GPUs). The method and the image conversion unit are very simple and the complete processing can be expressed within a single mathematical equation. The simpleness and linearity of the proposed algorithm makes it extremely suitable to be implemented in software and/or hardware.

The method and the corresponding unit might be used in graphic PC boards, computers, TV sets or other devices dealing with the display of video images.

Furtheron the proposed algorithm is very robust with respect to noise in the pixel values of the rows below and above the target pixel.

Having described so far a method for converting an image in interlaced format to progressive scan format, it is readily apparent for a person having ordinary skill in the art that it might be used for e.g. generating pixel values from pixel values of surrounding pixels in case no interlace to progressive scan format conversion is necessary, but e.g. for error correction for images or for scaling application, i.e. for increasing the number of pixels of an image. When scaling an image, the scaling might be performed by generating additional pixel values for pixels in horizontal lines (as it is depicted in FIGS. 2 to 5) but might be performed as well by generating additional pixel values for pixels in vertical lines, or any lines oriented otherwise.

A corresponding method might also be used for generating a pixel value of a target pixel of an image, the method, comprising: calculating a first value based on pixel values of a first set of pixels, wherein the first set of pixels do not include pixels in a column of the target pixel; determining a second value based on pixel values of a second set of pixels, wherein the second set of pixels are located in the column of the target pixel; and determining a pixel value of the target pixel based on adding the first and second values.

In a further embodiment of this method the first pixels include a first subset of pixels and a second subset of pixels in a row above the target pixel and a third subset of pixels and a fourth subset of pixels in a row below the target pixel, wherein the first and the third subset of pixels are situated in columns left of the target pixel and the second and the fourth subset of pixels are situated in columns right of the target pixel and wherein the step of calculating the first value includes: determining differences of pixel values of respective pairs of pixels situated in a common column of the first to fourth subset of pixels; determining a first sum of the differences of the columns left from the target pixel and a second sum of differences of the columns right from the target pixel; determining a further average value of the pixels in columns at the side of the target pixel with the lower absolute value of the first sum and the second sum; and using a negative first value if the further average value is below the second value and/or using a positive first value if the further average value is below the second value.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for converting an image in interlaced format to progressive scan format, comprising:
    determining a target pixel of pixels of the image;
    calculating a first value based on pixel values of a first set of pixels, wherein the first set of pixels do not include pixels in a column of the target pixel, the first set of pixels including a first subset of pixels and a second subset of pixels in a row above the target pixel and a third subset of pixels and a fourth subset of pixels in a row below the target pixel, wherein the first and the third subset of pixels are situated in columns left of the target pixel and the second and the fourth subset of pixels are situated in columns right of the target pixel;
    determining a second value based on pixel values of a second set of pixels, wherein the second set of pixels are located in the column of the target pixel, and wherein the step of calculating the first value includes:
        determining differences of pixel values of respective pairs of pixels situated in a common column of the first to fourth subset of pixels,
        determining a first sum of the differences of the columns left from the target pixel and a second sum of differences of the columns right from the target pixel,
        determining a further average value of the pixels in columns at the side of the target pixel with the lower absolute value of the first sum and the second sum, and
        using a negative first value if the further average value is below the second value; and
    determining a pixel value of the target pixel based on adding the first and second values.

2. The method according to claim 1, wherein the step of generating the pixel value includes:
    using a positive first value if the further average value is above the second value.

3. The method according to claim 1, wherein the first value is determined by weighting an absolute difference of the pixel values of pixels below and above the target pixel with the lower absolute value of the first sum and the second sum.

4. The method according to claim 3, wherein the first value is determined by subtracting one half of the lower absolute value of the first sum and the second sum from an absolute value of one half of a difference between the pixel values of pixels below and above the target pixel.

5. The method according to claim 1, wherein the first, second, third and fourth subset is equal to 2.

6. The method according to claim 1, wherein the first pixels include only pixels of rows adjacent to the target pixel.

7. The method according to claim 1, wherein the pixel value includes a luminance value.

8. The method according to claim 1, wherein the pixel value includes a chrominance value.

9. An image conversion unit, configured to convert an image in interlaced format to progressive scan format, the unit comprising:
    a determination unit configured to determine a target pixel of pixels of the image;
    a first processor configured to calculate a first value based on pixel values of a first set of pixels, wherein the first set of pixels do not include pixels in a column of the target pixel, the first set of pixels including a first subset of pixels and a second subset of pixels in a row above the target pixel and a third subset of pixels and a fourth subset of pixels in a row below the target pixel, wherein the first and the third subset of pixels are situated in columns left of the target pixel and the second and the fourth subset of pixels are situated in columns right of the target pixel;
    a second processor configured to determine a second value based on pixel values of a second set of pixels, wherein the second set of pixels are located in the column of the target pixel, and wherein the first processor is further configured to:
        determine differences of pixel values of respective pairs of pixels situated in a common column of the first to fourth subset of pixels,
        determine a first sum of the differences of the columns left from the target pixel and a second sum of differences of the columns right from the target pixel,
        determine a further average value of the pixels in columns at the side of the target pixel with the lower absolute value of the first sum and the second sum, and
        generate a negative first value if the further average value is below the second value and/or to generate a positive first value if the further average value is above the second value; and
    an adder configured to add the first and second values.

10. The image conversion unit according to claim 9, wherein the first value is determined by subtracting one half of the lower absolute value of the first sum and the second sum from an absolute value of one half of a difference between the pixel values of pixels below and above the target pixel.

11. The image conversion unit according to claim 9, wherein the first pixels include only pixels of rows adjacent to the target pixel.

12. A non-transitory computer readable storage medium, having stored thereon instructions which when executed by a processor causes the processor to perform a method for converting an image in interlaced format to progressive scan format, the method comprising:
    determining a target pixel of pixels of the image;
    calculating a first value based on pixel values of a first set of pixels, wherein the first set of pixels do not include pixels in a column of the target pixel, the first set of pixels including a first subset of pixels and a second subset of pixels in a row above the target pixel and a third subset of pixels and a fourth subset of pixels in a row below the target pixel, wherein the first and the third subset of pixels are situated in columns left of the target pixel and the second and the fourth subset of pixels are situated in columns right of the target pixel;

determining a second value based on pixel values of a second set of pixels, wherein the second set of pixels are located in the column of the target pixel, wherein the step of calculating the first value includes:
determining differences of pixel values of respective pairs of pixels situated in a common column of the first to fourth subset of pixels,
determining a first sum of the differences of the columns left from the target pixel and a second sum of differences of the columns right from the target pixel,
determining a further average value of the pixels in columns at the side of the target pixel with the lower absolute value of the first sum and the second sum, and
using a negative first value if the further average value is below the second value; and
determining a pixel value of the target pixel based on adding the first and second values.

\* \* \* \* \*